(12) United States Patent
Yumer et al.

(10) Patent No.: US 10,104,097 B1
(45) Date of Patent: Oct. 16, 2018

(54) SYSTEMS AND METHODS FOR PREVENTING TARGETED MALWARE ATTACKS

(71) Applicant: Symantec Corporation, Mountain View, CA (US)

(72) Inventors: Leylya Yumer, Paris (FR); Olivier Thonnard, Grasse (FR); Anand Kashyap, Los Altos, CA (US)

(73) Assignee: Symantec Corporation, Mountain View, CA (US)

( * ) Notice: Subject to any disclaimer, the term of this patent is extended or adjusted under 35 U.S.C. 154(b) by 68 days.

(21) Appl. No.: 14/569,302

(22) Filed: Dec. 12, 2014

(51) Int. Cl.
*H04L 29/06* (2006.01)

(52) U.S. Cl.
CPC .......... *H04L 63/1416* (2013.01); *H04L 63/20* (2013.01)

(58) Field of Classification Search
CPC ... H04L 63/1483; H04L 63/101; H04L 63/20; H04L 63/10; H04L 63/102; H04L 67/10; H04L 67/43; H04L 63/1416; H04L 63/02227; H04L 63/205; G06F 21/56; G06F 21/575; G06F 21/564; G06F 17/30867
USPC ............................................. 726/3, 4, 12, 23
See application file for complete search history.

(56) References Cited

U.S. PATENT DOCUMENTS

| | | | | |
|---|---|---|---|---|
| 2006/0253458 | A1* | 11/2006 | Dixon | G06Q 30/02 |
| 2010/0049975 | A1* | 2/2010 | Parno | H04L 63/08 |
| | | | | 713/168 |
| 2010/0250497 | A1* | 9/2010 | Redlich | F41H 13/00 |
| | | | | 707/661 |
| 2011/0061089 | A1* | 3/2011 | O'Sullivan | H04L 63/102 |
| | | | | 726/1 |
| 2011/0302623 | A1* | 12/2011 | Ricci | G06F 21/121 |
| | | | | 726/1 |
| 2013/0097701 | A1* | 4/2013 | Moyle | G06F 21/552 |
| | | | | 726/22 |

(Continued)

OTHER PUBLICATIONS

Carlinet, L. et al., "Analysis of Computer Infection Risk Factors Based on Customer Network Usage", Mar. 30, 2003, IEEE Societies, vol. 3, all pages.*

(Continued)

*Primary Examiner* — Ashok Patel
*Assistant Examiner* — William B Jones
(74) *Attorney, Agent, or Firm* — FisherBroyles, LLP

(57) ABSTRACT

The disclosed computer-implemented method for preventing targeted malware attacks may include (1) identifying at least one candidate risk factor for targets of previous targeted malware attacks that were directed to the targets based on characteristics of the targets, (2) calculating a degree of association between the candidate risk factor and the previous targeted malware attacks by comparing rates of targeted malware attacks between a group that possesses the risk factor and a group that does not possess the risk factor, (3) identifying a candidate target of a targeted malware attack that possesses the candidate risk factor, and (4) adjusting a security policy assigned to the candidate target of the targeted malware attack based on the calculated degree of association between the candidate risk factor and the previous targeted malware attacks. Various other methods, systems, and computer-readable media are also disclosed.

20 Claims, 7 Drawing Sheets

(56) References Cited

U.S. PATENT DOCUMENTS

2015/0007331 A1* 1/2015 Pfeifer, Jr. .......... H04L 63/1433
726/25

OTHER PUBLICATIONS

Carlinet, Yannick, et al. "Analysis of computer infection risk factors based on customer network usage." 2008, Emerging Security Information, Systems and Technologies, 2008. SECURWARE'08, Second International Conference, all.*

Carlinet, Yannick et al, "Analysis of Computer Infection Risk Facctors based on customer network usage",2008 Emerging Information Systems and Technologies, SECUREWARE 2008, all.*

Thonnard, Olivier et al., "Are You at Risk? Profiling Organizations and Individuals Subject to Targeted Attacks", Symantec Research Lab, (Sep. 15, 2014).

Kephart, J.O. et al., "Directed-graph epidemiological models of computer viruses", http://ieeexplore.ieee.org/xpl/login.jsp?tp=&arnumber=130801&url=http%3A%2F%2Fieeexplore.ieee.org%2Fxpls%2Fabs_all.jsp%3Farnumber%3D130801, as accessed Oct. 17, 2014, Research in Security and Privacy, 1991 IEEE Computer Society Symposium, Oakland, CA, (May 20-22, 1991), pp. 343-359.

"Kermack-McKendrick Model", http://mathworld.wolfram.com/Kermack-McKendrickModel.html, as accessed Oct. 17, 2014, (Feb. 25, 2004).

Zou, Cliff C., et al., "Code Red Worm Propagation Modeling and Analysis", http://www.eecs.ucf.edu/~czou/research/codered.pdf, as accessed Oct. 17, 2014, CCS '02 Proceedings of the 9th ACM Conference on Computer and Communications Security, Washington, DC, (Nov. 18-22, 2002), pp. 138-147.

Wang, Fangwei et al., "Stability analysis of a SEIQV epidemic model for rapid spreading worms", http://www.sciencedirect.com/science/article/pii/S0167404809001096, as accessed Oct. 17, 2014, Computers & Security, vol. 29, Issue 4, (Jun. 2010), pp. 410-418.

Zou, Cliff C., et al., "Worm Propagation Modeling and Analysis under Dynamic Quarantine Defense", http://citeseerx.ist.psu.edu/viewdoc/summary?doi=10.1.1.2.1537, as accessed Oct. 17, 2014, WORM'03, Washington, DC, (Oct. 27, 2003).

Moore, David "Internet Quarantine: Requirements for Containing Self-Propagating Code", http://cseweb.ucsd.edu/~savage/papers/Infocom03.pdf, as accessed Oct. 17, 2014, INFOCOM 2003, Twenty-Second Annual Joint Conference of the IEEE Computer and Communications, IEEE Societies, (Mar. 30-Apr. 3, 2003), pp. 1901-1910, vol. 3.

Carlinet, L. et al., "Analysis of Computer Infection Risk Factors Based on Customer Network Usage", http://ieeexplore.ieee.org/xpl/articleDetails.jsp?arnumber=4622601, as accessed Oct. 17, 2014, Second International Conference on Emerging Security Information, Systems and Technologies, 2008, SECURWARE '08, CAP Esterel, (Aug. 25-31, 2008), pp. 317-325.

Bossler, Adam M., et al., "On-line Activities, Guardianship, and Malware Infection: An Examination of Routine Activities Theory", http://www.cybercrimejournal.com/bosslerholtjan2009.htm, as accessed Oct. 17, 2014, International Journal of Cyber Criminology (IJCC), (Jan.-Jun. 2009), pp. 400-420, vol. 3 Issue 1.

Lee, Martin "Who's Next? Identifying Risk Factors for Subjects of Targeted Attack.", https://www.virusbtn.com/pdf/conference_slides/2012/MLee-VB2012.pdf, as accessed Oct. 17, 2014, Symantec Corporation, VB 2012, (2012).

"Targeted threat", http://en.wikipedia.org/wiki/Targeted_threat, as accessed Oct. 17, 2014, Wikipedia, (Nov. 12, 2011).

* cited by examiner

Ratio Table 500

| | Received One of Previous Targeted Attacks 210 | Did Not Receive One of Previous Targeted Attacks 210 |
|---|---|---|
| Possesses Risk Factor 208(1) | .67 | .33 |
| Does Not Possess Risk Factor 208(1) | .17 | .83 |

Ratio Table 502

| | Received One of Previous Targeted Attacks 210 | Did Not Receive One of Previous Targeted Attacks 210 |
|---|---|---|
| Possesses Risk Factor 208(2) | .50 | .50 |
| Does Not Possess Risk Factor 208(2) | .33 | .67 |

*FIG. 5*

SYSTEMS AND METHODS FOR PREVENTING TARGETED MALWARE ATTACKS

BACKGROUND

Although rare, targeted malware attacks (e.g., spear-phishing attacks) pose serious and harmful threats to individuals and organizations that store or manage secure or sensitive data. As opposed to worms and viruses that are designed to spread quickly across multiple computing systems, targeted attacks may be tailored and directed to a specific organization or an individual within an organization. For example, an attacker may distribute a seemingly-legitimate email requesting access to sensitive information to an individual known to have access to the information. In another example, an attacker may design malicious software to specifically evade the security measures implemented within a particular computing system. As a result, conventional anti-malware systems that scan messages and other files for known indications of malware may be unable to effectively detect sophisticated and personalized targeted malware attacks.

In addition, even if a traditional anti-malware system is capable of detecting targeted malware attacks, the system may use excessive time and computing resources (compared to detecting other types of malware) in order to detect such advanced attacks. As such, implementing targeted malware attack detection systems across large companies or enterprises may be impractical or ineffective. Accordingly, the current disclosure identifies a need for improved methods for preventing targeted malware attacks.

SUMMARY

As will be described in greater detail below, the instant disclosure describes various systems and methods for preventing targeted malware attacks by, for example, calculating a degree of association between at least one risk factor of targets of targeted malware attacks and previous targeted malware attacks. The degree of association may be analyzed and used to adjust a security policy assigned to a candidate target of a targeted malware attack that possesses the risk factor.

In one example, a computer-implemented method for preventing targeted malware attacks may include (1) identifying at least one candidate risk factor for targets of previous targeted malware attacks that were directed to the targets based on characteristics of the targets, (2) calculating a degree of association between the candidate risk factor and the previous targeted malware attacks by comparing rates of targeted malware attacks between a group that possesses the risk factor and a group that does not possess the risk factor, (3) identifying a candidate target of a targeted malware attack that possesses the candidate risk factor, and (4) adjusting a security policy assigned to the candidate target of the targeted malware attack based on the calculated degree of association between the candidate risk factor and the previous targeted malware attacks. In some embodiments, the method may further include detecting that an attacker directed the targeted malware attack to the candidate target after the adjustment of the security policy.

In some examples, the targets of the previous targeted malware attacks may include organizations. In these examples, the candidate risk factor for the organizations may include a sector of the organizations and/or a size of the organizations. Additionally or alternatively, the targets of the previous targeted malware attacks may include individuals. In these examples, the candidate risk factor for the individuals may include a job level of the individuals, a job type of the individuals, a geographic location of the individuals, and/or a number of interpersonal connections made by the individuals via a social networking site.

In some embodiments, comparing the rates of targeted malware attacks between the group that possesses the risk factor and the group that does not possess the risk factor may include identifying a ratio of individuals within the group that possesses the risk factor who were not targets of the previous targeted malware attacks. Such embodiments may also include identifying a ratio of individuals within the group that does not possess the risk factor who were targets of the previous targeted malware attacks.

In some examples, the candidate target may represent an individual within an organization. In these examples, adjusting the security policy may include adjusting the security policy based on a combination of a calculated degree of association for a risk factor of the individual and a calculated degree of association for a risk factor of the organization.

In some embodiments, adjusting the security policy assigned to the candidate target may include calculating, based on the calculated degree of association, a probability that an attacker will direct the targeted malware attack to the candidate target. In such embodiments, the method may include adjusting the security policy based on determining that the calculated probability exceeds a predetermined threshold.

In some examples, adjusting the security policy assigned to the candidate target may include tightening existing restrictions imposed by the security policy and/or adding new restrictions to the security policy. Additionally or alternatively, adjusting the security policy may include relaxing existing restrictions imposed by the security policy and/or removing restrictions from the security policy.

In one embodiment, a system for implementing the above-described method may include (1) a risk factor module that identifies at least one candidate risk factor for targets of previous targeted malware attacks that were directed to the targets based on characteristics of the targets, (2) a calculation module that calculates a degree of association between the candidate risk factor and the previous targeted malware attacks by comparing rates of targeted malware attacks between a group that possesses the risk factor and a group that does not possess the risk factor, (3) a target module that identifies a candidate target of a targeted malware attack that possesses the candidate risk factor, and (4) an adjustment module that adjusts a security policy assigned to the candidate target of the targeted malware attack based on the calculated degree of association between the candidate risk factor and the previous targeted malware attacks. In addition, the system may include at least one processor that executes the risk factor module, the calculation module, the target module, and the adjustment module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify at least one candidate risk factor for targets of previous targeted malware attacks that were directed to the targets based on characteristics of the targets, (2) calculate a degree of association between the candidate risk factor and the previous targeted malware attacks by comparing rates of targeted malware attacks between a group that possesses the risk factor and a group that does not possess the risk factor, (3) identify a candidate target of a targeted malware attack that possesses the candidate risk factor, and (4) adjust a security policy assigned to the candidate target of the targeted malware attack based on the calculated degree of association between the candidate risk factor and the previous targeted malware attacks.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is an illustration of exemplary tables used to calculate odds ratios for candidate risk factors.

Figure 1:
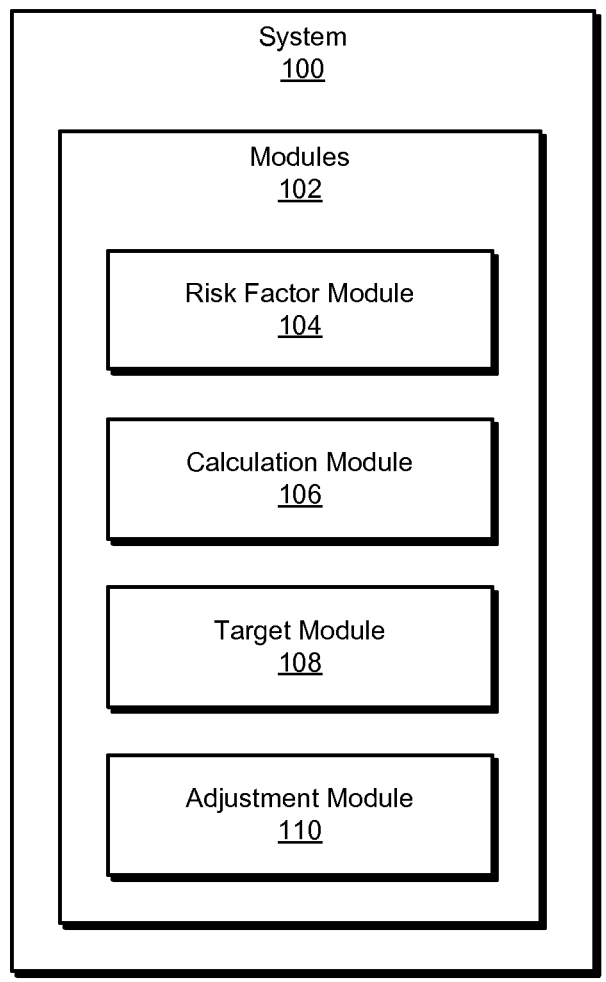
FIG. 1 is a block diagram of an exemplary system for preventing targeted malware attacks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for preventing targeted malware attacks. As will be explained in greater detail below, by identifying characteristics (e.g., risk factors) of targets of previous targeted malware attacks, the disclosed systems and methods may quantify (via, e.g., analyses used in epidemiological studies) an association between the risk factors and the targeted malware attacks. In addition, the disclosed systems and methods may use the associations between the risk factors and the previous targeted malware attacks to predict and prevent future targeted malware attacks. For example, the disclosed systems and methods may adjust security policies assigned to candidate targets of targeted malware attacks based on the degree to which characteristics of the candidate targets are associated with previous targeted attacks. As such, the disclosed systems and methods may prevent malicious attacks that are specifically directed to targets based on profiles of the targets, therefore increasing the safety and security of sensitive information handled by the targets.

Figure 2:
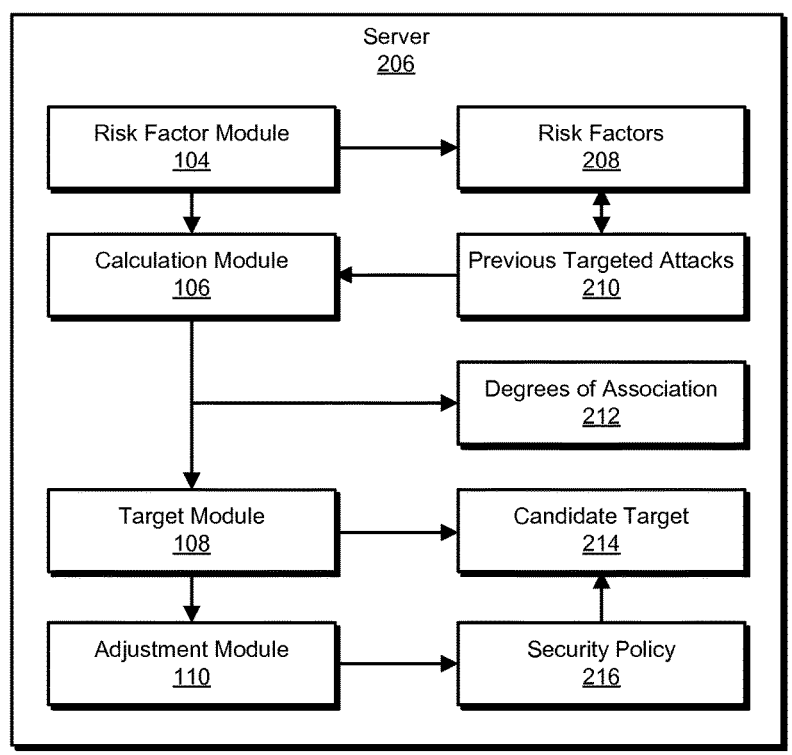
FIG. 2 is a block diagram of an additional exemplary system for preventing targeted malware attacks.

The following will provide, with reference to FIGS. 1 and 2, detailed descriptions of exemplary systems for preventing targeted malware attacks. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for preventing targeted malware attacks. As illustrated in this figure, exemplary system 100 may include one or more modules 102 for performing one or more tasks. For example, and as will be explained in greater detail below, exemplary system 100 may include a risk factor module 104 that identifies at least one candidate risk factor for targets of previous targeted malware attacks that were directed to the targets based on characteristics of the targets. Exemplary system 100 may also include a calculation module 106 that calculates a degree of association between the candidate risk factor and the previous targeted malware attacks by comparing rates of targeted malware attacks between a group that possesses the risk factor and a group that does not possess the risk factor.

In addition, and as will be described in greater detail below, exemplary system 100 may include a target module 108 that identifies a candidate target of a targeted malware attack that possesses the candidate risk factor. Finally, exemplary system 100 may include an adjustment module 110 that adjusts a security policy assigned to the candidate target of the targeted malware attack based on the calculated degree of association between the candidate risk factor and the previous targeted malware attacks. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as a server 206 in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. In the example of FIG. 2, each of modules 102 within system 100 may reside server-side on server 206. However, in other examples, one or more of modules 102 may reside client-side (e.g., on a computing device associated with a candidate target of a targeted malware attack).

In one embodiment, one or more of modules 102 from FIG. 1 may, when executed by at least one processor of server 206, enable server 206 to prevent targeted malware attacks. For example, and as will be described in greater detail below, one or more of modules 102 may cause server 206 to identify at least one candidate risk factor (e.g., one of risk factors 208) for targets of previous targeted malware attacks (e.g., previous targeted attacks 210) that were directed to the targets based on characteristics of the targets. Next, one or more of modules 102 may cause server 206 to calculate one or more degrees of association (e.g., degrees of association 212) between risk factors 208 and previous targeted attacks 210 by comparing rates of targeted malware attacks between a group that possesses the risk factor and a group that does not possess the risk factor. In addition, one or more of modules 102 may cause server 206 to identify a candidate target (e.g., candidate target 214) that possesses at least one of risk factors 208. Finally, one or more of modules 102 may cause server 206 to adjust a security policy (e.g., security policy 216) assigned to candidate target 214 based on degrees of association 212.

The term "targeted malware attack," as used herein, generally refers to software-based attacks that are directed to, and tailored for, an individual or organization based on their specific characteristics and vulnerabilities (e.g., vulnerabilities of their computing systems). Notably, targeted malware attacks generally differ from other types of malware attacks (e.g., viruses, worms, etc.) that are designed to infect as many computing devices as possible without targeting specific individuals and organizations. For example, an attacker may design a targeted malware attack for a specific target.

As discussed above, attackers may direct targeted attacks to particular organizations or enterprises and/or individuals within organizations. For example, attackers may direct targeted attacks to organizations known to handle sensitive and/or confidential information (e.g., financial data, classified research, etc.). In some examples, attackers may target specific individuals (e.g., executives, managers, etc.) within organizations that are more likely to have access to sensitive information. Attackers may carry out targeted malware attacks in a variety of ways. As an example, an attacker may send a seemingly-legitimate email to a target requesting access to restricted information accessible by the target (i.e., a spear-phishing attack). In another example, an attacker may distribute malicious software to a computing device or server known to contain sensitive information. Specifically, an attacker may design malware to circumvent or disable particular security measures implemented on the targeted computing device.

In the example of FIG. 2, a computing device or server may identify risk factors 208 (e.g., by identifying characteristics of targets of previous targeted attacks 210). The computing device may then calculate degrees of association 212 that indicate how strongly the presence of risk factors 208 are associated with previous targeted attacks 210. Next, the computing device may use degrees of association 212 to adjust security policy 216 assigned to candidate target 214. For example, degrees of association 212 may indicate that the presence or absence of one or more of risk factors 208 possessed by candidate target 214 puts candidate target 214 at either an increased or decreased risk of receiving a targeted attack. Therefore, the computing device may adjust security policy 216 to correspond to the risk of candidate target 214 receiving a targeted malware attack.

Server 206 generally represents any type or form of computing device that is capable of storing and analyzing data associated with targeted malware attacks. Examples of server 206 include, without limitation, application servers and database servers configured to provide various database services and/or run certain software applications.

Figure 3:
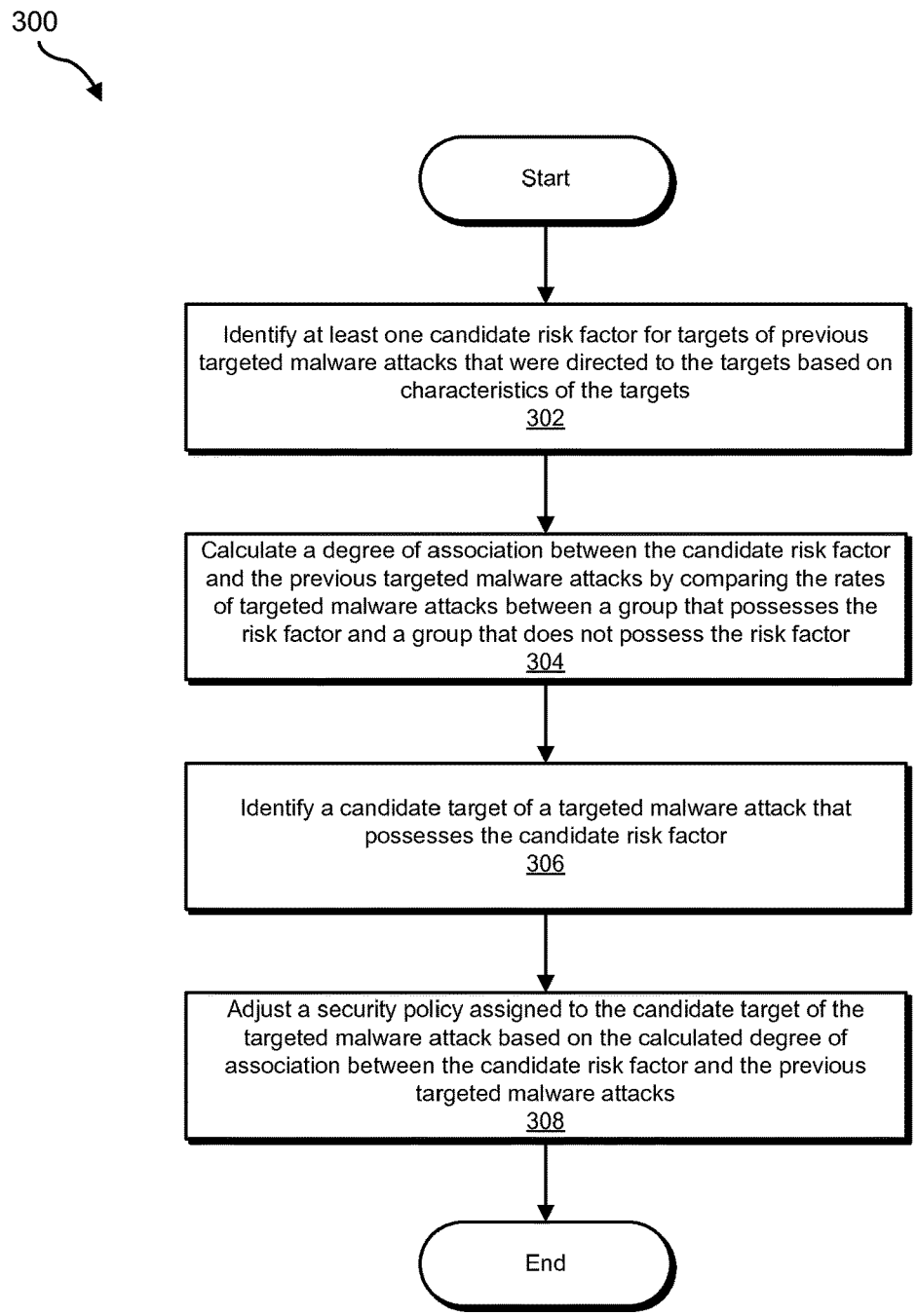
FIG. 3 is a flow diagram of an exemplary method for preventing targeted malware attacks.

FIG. 3 is a flow diagram of an exemplary computer-implemented method 300 for preventing targeted malware attacks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify at least one candidate risk factor for targets of previous targeted malware attacks that were directed to the targets based on characteristics of the targets. For example, risk factor module 104 may, as part of server 206 in FIG. 2, identify risk factors 208 of targets of previous targeted attacks 210.

The term "risk factor," as used herein, generally refers to any type or form of property, characteristic, or feature of individual(s) or organization(s) that may be associated with a particular outcome. As used in epidemiological studies, a risk factor may describe any behavior or characteristic of a person that is associated with the outcome of the person developing or contracting a particular disease (e.g., the use of tobacco products may be a risk factor associated with lung cancer). As applied to preventing targeted malware attacks, a risk factor may represent any characteristic of an organization or individual that may be associated with the outcome of being a target of a targeted malware attack. Notably, a risk factor may be a binary variable (i.e., an individual may either possess a risk factor or not possess the risk factor). Moreover, the term "candidate risk factor," as used herein, generally refers to any factor that may be associated with the outcome of receiving a targeted malware attack, but does not necessarily satisfy a threshold for being categorized as a risk factor.

Examples of risk factors of an individual include, without limitation, a job level of the individual (e.g., intern, temporary worker, support staff, contractor, manager, director, executive, etc.), a job type of the individual (e.g., operations, engineering, Information Technology (IT), sales/marketing, human resources, finance, legal, quality assurance, research, etc.), a geographic location of the individual (e.g., a city, state, region, or country), a number of interpersonal connections made by the individual via a social networking site (e.g., 0, 1-250, or 250-500 connections, etc.), a length of time the individual has been associated with an organization (e.g., less than one month, greater than three years, etc.), an amount that the individual travels (e.g., fewer than three times a year, more than six times a year, etc.), an age of the individual (e.g., 20-25 years old, 30-40 years old, etc.), and/or any additional characteristic of an individual. In addition, risk factors of an organization include, without limitation, a sector of the organization (e.g., national security, international affairs, transportation, energy, chemicals, public safety, printing/publishing, agriculture, construction, etc.), a size of the organization (e.g., 1-50 employees, 51-200 employees, 201-1000 employees, etc.), an age of the organization (e.g., less than one year, greater than 10 years, etc.) and/or any additional characteristic of an organization. Notably, the term "individual," as used herein, generally refers to a specific person or, instead, to whomever matches a particular career title, track, position, location, responsibility, computing system, user account, etc.

The systems described herein may identify one or more candidate risk factors for targets of previous targeted malware attacks in a variety of ways. In some examples, risk factor module 104 may identify risk factors 208 by first identifying the targets of previous targeted attacks 210. For example, risk factor module 104 may access or analyze a database (e.g., managed by an anti-malware enterprise) that stores information identifying individuals and/or organizations of individuals that received targeted attacks. Specifically, risk factor module 104 may identify the names of targets of previous targeted attacks 210 by analyzing email addresses that received previous targeted attacks 210. For example, risk factor module 104 may derive the names and/or organizations of individuals from email addresses that have a format of <firstname>.<lastname>@<organizationdomain>.com or a similar format. Additionally or alternatively, risk factor module 104 may actively monitor email and other electronic messaging services of one or more individuals (e.g., across multiple organizations) in order to detect new instances of targeted malware attacks.

Once risk factor module 104 identifies the targets of previous targeted attacks 210, risk factor module 104 may identify characteristics of the targets in order to determine risk factors 208. In some examples, risk factor module 104 may identify risk factors 208 within the same database that stores information identifying the targets of previous targeted attacks 210. Additionally or alternatively, risk factor module 104 may identify risk factors 208 by performing a web search or crawling the web for risk factors 208. For example, risk factor module 104 may determine risk factors of organizations by analyzing company websites and/or online databases that store information about multiple organizations (e.g., www.leadferret.com, www.companycheck.co.uk, etc.). In addition, risk factor module 104 may determine risk factors of individuals by analyzing online profiles (e.g., LINKEDIN or other social networking profiles) of the targets.

In some examples, risk factor module 104 may also identify risk factors for a "control group" of individuals and organizations that were not targets of previous targeted attacks 210. The term "control group," as used herein, generally refers to any population or sample that is not afflicted with a particular outcome (e.g., the outcome of receiving a targeted malware attack). In one example, risk factor module 104 may identify a control group by searching the database managed by the anti-malware enterprise for the names and organizations of individuals that did not receive one of previous targeted attacks 210. After identifying the names of those in the control group, risk factor module 104 may repeat the process of analyzing websites, databases, and/or online profiles in order to identify the same set of risk factors for the control group as identified for the targets of previous targeted attacks 210.

Figure 4:
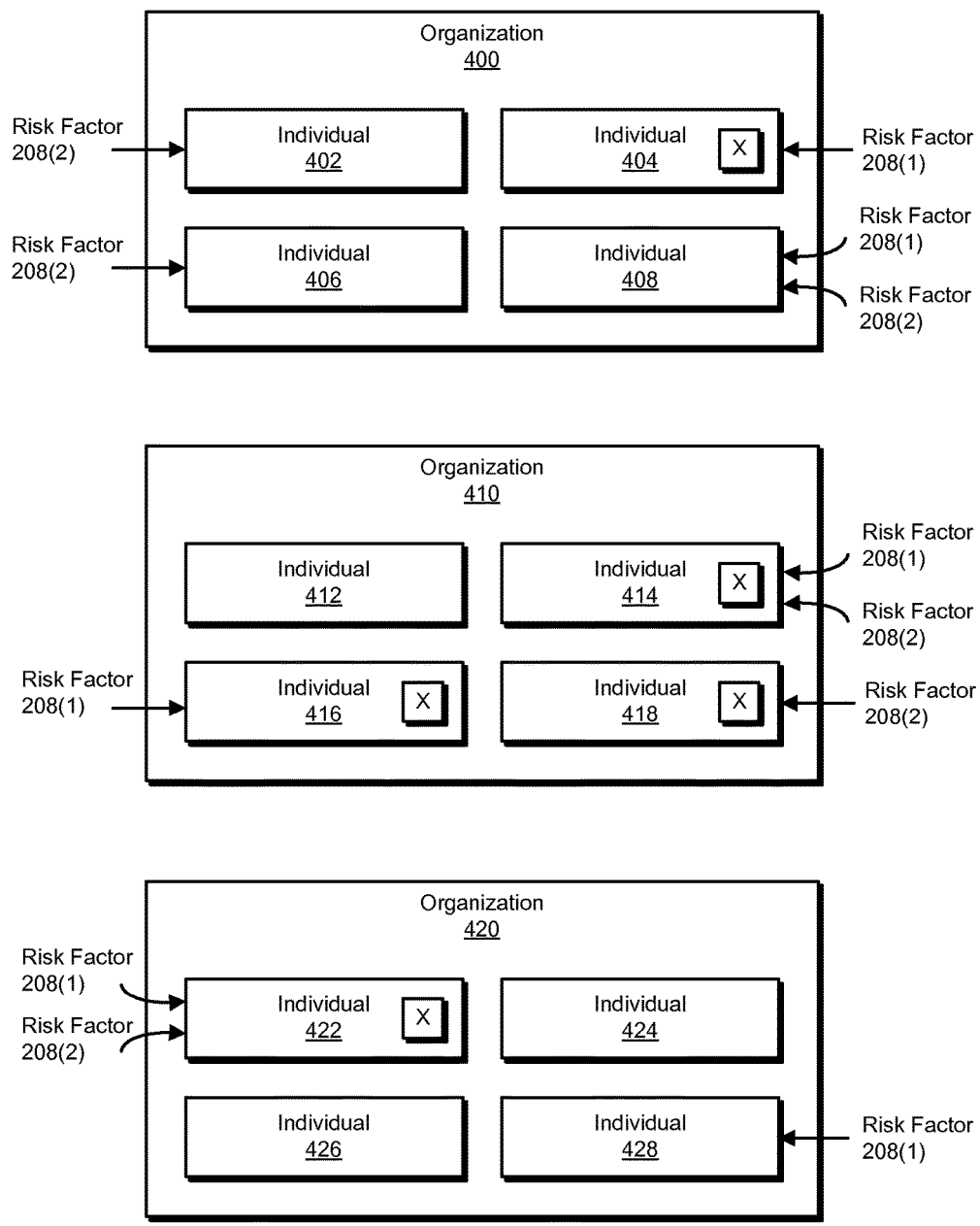
FIG. 4 is an illustration of exemplary individuals within organizations that are targets of targeted malware attacks.

As an example, FIG. 4 illustrates instances of targeted malware attacks across individuals possessing varying sets of risk factors. Specifically, FIG. 4 illustrates individuals 402, 404, 406, 408 (within an organization 400), 412, 414, 416, 418 (within an organization 410), 422, 424, 426, and 428 (within an organization 420). As indicated by the labels in FIG. 4, each individual may possess a risk factor 208(1), a risk factor 208(2), both risk factor 208(1) and risk factor 208(2), or no risk factor. As an example, risk factor 208(1) may represent the property of being located in San Francisco. As an additional example, risk factor 208(2) may represent the property of being a manager within an organization. Moreover, in this example, targets of one or more of previous targeted attacks 210 are indicated with an "X," as shown in FIG. 4.

Returning to FIG. 3, at step 306 one or more of the systems described herein may calculate a degree of association between the candidate risk factor and the previous targeted malware attacks by comparing rates of targeted malware attacks between a group that possesses the risk factor and a group that does not possess the risk factor. For example, calculation module 106 may, as part of server 206 in FIG. 2, calculate degrees of association 212 between risk factors 208 and previous targeted attacks 210 by comparing rates of targeted malware attacks between groups that possess one or more of risk factors 208 and groups that do not possess risk factors 208.

The term "degree of association," as used herein, generally refers to any type or form of measurement, calculation, or quantification that describes the strength of a relationship between two variables (e.g., a risk factor and an outcome). In some examples, two variables with a numerically lower degree of association may be less related than two variables with a numerically higher degree of association. A degree of association may be determined by a variety of statistical analyses or methods, such as by calculating a degree of correlation, a coefficient of association, a rate ratio, an incidence density ratio, etc.

The systems described herein may calculate a degree of association between the candidate risk factor and the previous targeted malware attacks in a variety of ways. In an exemplary embodiment, calculation module 106 may calculate degrees of association 212 by calculating an odds ratio for each of risk factors 208. The term "odds ratio," as used herein, generally refers to any fraction, number, or proportion that describes how strongly the presence or absence of a property is associated with the presence or absence of a second property. As used in epidemiological studies, an odds ratio may be calculated as part of a case-control study to quantify the association between a behavior or characteristic of an individual and the outcome of the individual contracting or developing a disease. As applied to preventing targeted malware attacks, an odds ratio may be used to quantify the association between a characteristic of a target of a targeted malware attack and the outcome of the target receiving the targeted malware attack.

In one example, an odds ratio may be calculated with the equation odds $$= \frac{p_{11} p_{00}}{p_{10} p_{01}},$$

where $p_{11}$ represents the ratio of individuals within the group that possesses the risk factor who experience the outcome, $p_{10}$ represents the ratio of individuals within the group that possesses the risk factor who do not experience the outcome, $p_{01}$ represents the ratio of individuals within the group that does not possess the risk factor who experience the outcome, and $p_{00}$ represents the ratio of individuals within the group that does not possess the risk factor who do not experience the outcome.

Referring to the example of FIG. 4, calculation module 106 may calculate odds ratios for risk factor 208(1) and 208(2). FIG. 5 includes a ratio table 500 that illustrates ratios calculation module 106 may use to calculate the odds ratio for risk factor 208(1). As shown in FIG. 5, ratio table 500 may include a ratio of individuals within the group that possesses risk factor 208(1) who received one or more of previous targeted attacks 210 and a ratio of individuals within the group that possesses risk factor 208(1) who did not receive one of previous targeted attacks 210 (these ratios necessarily sum to 1). In addition, ratio table 500 may include a ratio of individuals within the group that does not possess risk factor 208(1) who did receive one of previous targeted attacks 210 and a ratio of individuals within the group that does not possess risk factor 208(1) who did not receive one of previous targeted attacks 210 (these ratios must also necessarily sum to 1).

As shown in FIG. 4, out of the six individuals who possess risk factor 208(1), four were targets of previous targeted attacks 210. Accordingly, two out of the six individuals who possess risk factor 208(1) were not targets of previous targeted attacks 210. These ratios (i.e., 0.67 and 0.33) are shown within ratio table 500. In addition, as shown in FIG. 4, out of the six individuals who do not possess risk factor 208(1), only one was a target of previous targeted attacks 210. Accordingly, five out of the six individuals who do not possess risk factor 208(1) were not targets of previous targeted attacks 210. These ratios (i.e., 0.17 and 0.83) are also shown within ratio table 500. A similar process may be used to determine the ratios within a ratio table 502 in FIG. 5, which describes associations between risk factor 208(2) and previous targeted attacks 210 within the individuals illustrated in FIG. 4.

Applying the formula for an odds ratio described above, calculation module 106 may use the ratios within ratio table 500 to calculate an odds ratio for risk factor 208(1). Specifically, calculation module 106 may calculate the odds ratio for risk factor 208(1) as (0.67*0.83)/(0.17*0.33)=9.91. Similarly, calculation module 106 may calculate the odds ratio for risk factor 208(2) as (0.50*0.67)/(0.33*0.50)=2. In general, an odds ratio of over one may indicate that the presence of a risk factor is positively associated with an outcome. As such, the calculated odds ratios for risk factors 208(1) and 208(2) may indicate that both risk factors are positively associated with previous targeted attacks 210. Furthermore, risk factor 208(1) may be more strongly associated with previous targeted attacks 210 than risk factor 208(2), based on risk factor 208(1) having a higher odds ratio than risk factor 208(2).

Although FIG. 5 illustrates ratio tables for only two risk factors of individuals, calculation module 106 may calculate odds ratios for any number of candidate risk factors. For example, calculation module 106 may calculate odds ratios for each of risk factors 208 identified by risk factor module 104, including risk factors of both organizations and individuals.

Returning to FIG. 3, at step 306 one or more of the systems described herein may identify a candidate target of a targeted malware attack that possesses the candidate risk factor. For example, target module 108 may, as part of server 206 in FIG. 2, identify candidate target 214 that possesses one or more of risk factors 208.

The term "candidate target," as used herein, generally refers to any organization or individual protected by a security system against potential targeted attacks. In some examples, any individual or organization that may be contacted via, or is associated with, a computing device with a network connection may be a candidate target.

The systems described herein may identify a candidate target that possesses the candidate risk factor in a variety of ways. In some examples, the systems described herein may operate in the context of an anti-malware system implemented within an organization. In these examples, target module 108 may maintain and/or search a database of individuals (and their associated risk factors) within the organization in order to identify candidate target 214 (and any additional candidate targets) that possess a certain one or combination of risk factors 208. In other examples, the systems described herein may be used on a broader scale to identify entire organizations that may be at risk for targeted malware attacks. In these examples, target module 108 may perform a web search or search a database of organizations to identify organizations that possess a certain one or combination of risk factors 208.

Returning to FIG. 3, at step 308 one or more of the systems described herein may adjust a security policy assigned to the candidate target of the targeted malware attack based on the calculated degree of association between the candidate risk factor and the previous targeted malware attacks. For example, adjustment module 110 may, as part of server 206 in FIG. 2, adjust security policy 216 assigned to candidate target 214 based on degrees of association 212.

The term "security policy," as used herein, generally refers to any one or combination of restrictions, limitations, or rules designed to prevent and/or detect security threats (e.g., targeted malware attacks). In some examples, an IT administrator of an organization may implement one or more security policies for the organization as a whole and/or for specific individuals within the organization. A security policy may implement any number or type of restrictions, such as ensuring that each electronic message received by an account (or each received message matching certain criteria, such as having been sent from an unknown sender) be scanned for malicious content before a user of the account may access the message.

The systems described herein may adjust a security policy assigned to the candidate target based on the calculated degree of association in a variety of ways. In some examples, adjustment module 110 may adjust security policy 216 as part of creating security policy 216 or as part of adjusting a preexisting security policy. In other examples, adjustment module 110 may perform the adjustment based simply on determining that a single degree of association for a risk factor possessed by candidate target 214 (e.g., risk factor 208(1)) indicates a positive association or correlation between the risk factor and previous targeted attacks 210 (e.g., the odds ratio for risk factor 208(1) is greater than 1 or some predetermined threshold). In further examples, adjustment module 110 may base a degree or amount of the adjustment (e.g., a degree of adjusting a security value or threshold) on the calculated degree of association (e.g., in proportion to the calculated degree of association).

In other examples, adjustment module 110 may determine to adjust security policy 216 based on a more complex analysis of risk factors 208. For example, adjustment module 110 may analyze the degrees of association calculated for several of risk factors 208 that candidate target 214 possesses. In one example, adjustment module 110 may determine to adjust security policy 216 based on candidate target 214 possessing at least a predetermined number (e.g., 5) of risk factors with degrees of association above a predetermined threshold (e.g., an odds ratio above 1). In another example, adjustment module 110 may weight one or more of degrees of association 212 to calculate an overall measure of the association between the profile (e.g., a compilation of characteristics) of candidate target 214 and previous targeted attacks 210.

In an exemplary embodiment, candidate target 214 may represent an individual within an organization. In this embodiment, adjustment module 110 may combine a degree of association for a risk factor possessed by the individual and a degree of association for a risk factor possessed by the organization with which the individual is associated. For example, adjustment module 110 may combine a degree of association for the risk factor of an individual being a manager and a degree of association for the risk factor of an organization having 250-500 employees. In this way, the systems described herein may produce a more robust, comprehensive assessment of a candidate target's risk of receiving a targeted attack.

In some embodiments, adjustment module 110 may use degrees of association 212 to calculate a probability that an attacker will direct a targeted malware attack to candidate target 214. For example, associations between risk factors 208 and previous targeted attacks 210 (e.g., odds ratios of risk factors 208) may not directly indicate the likelihood that the presence of a certain risk factor will lead to a targeted malware attack. An odds ratio may indicate a correlation between a risk factor and an outcome, rather than a causal relationship between the risk factor and the outcome. As such, adjustment module 110 may convert one or more of degrees of association 212 into a numerical score that indicates or estimates the probability of candidate target 214 receiving a targeted malware attack.

For example, adjustment module 110 may compute an overall measure of the risk factors possessed by candidate target 214 (e.g., by weighting and combining one or more of degrees of association 212). Adjustment module 110 may also compute overall measures of the risk factors possessed by the targets of previous targeted attacks 210 and/or overall measures of the risk factors possessed by individuals and organizations who were not targets. Adjustment module 110 may then determine a likelihood that candidate target 214 will receive a targeted attack based on a comparison of the overall measure of risk factors possessed by candidate target 214 with the overall measures of risk factors possessed by the previous targets and non-targets.

In general, adjustment module 110 may combine any statistical method or additional data with degrees of association 212 to calculate a probability that an attacker will direct a targeted malware attack to candidate target 214. Once adjustment module 110 calculates the probability that an attacker will direct a targeted malware attack to candidate target 214, adjustment module 110 may determine to adjust security policy 216 based on whether the calculated probability exceeds a predetermined threshold (e.g., 75%).

Adjustment module 110 may adjust security policy 216 in a variety of ways. In some examples, adjustment module 110 may tighten or strengthen security policy 216. For example, adjustment module 110 may add one or more new restrictions to security policy 216. Specifically, adjustment module 110 may add a restriction that ensures every email sent to candidate target 214 by an unknown or unrecognized sender is scanned for a targeted malware attack before candidate target 214 is permitted to access the emails. In another example, adjustment module 110 may tighten one or more existing restrictions within security policy 216. Specifically, an existing restriction may state that every email sent to candidate target 214 from an unknown source must be scanned. In response to determining that the probability that an attacker will direct a targeted attack to candidate target 214 exceeds a predetermined threshold, adjustment module 110 may tighten that restriction to ensure that every received email is to be scanned, regardless of whether the sender is known or not.

Additionally or alternatively, adjustment module 110 may adjust security policy 216 by ensuring that candidate target 214 adjusts one or more behaviors (rather than implementing malware scans or other software-based restrictions). For example, adjustment module 110 may recommend that candidate target 214 reduce the number of interpersonal connections established on a social networking profile (e.g., in response to determining that the number of interpersonal connections made by candidate target 214 is a risk factor with a degree of association above a certain threshold).

In some examples, adjustment module 110 may relax security policy 216 based on an analysis of degrees of association 212. For example, adjustment module 110 may determine that candidate target 214 does not possess any risk factors that have degrees of association above a certain threshold. In general, adjustment module 110 may determine that the risk of candidate target 214 receiving a targeted malware attack is relatively low (e.g., compared to other candidate targets). In response to determining that the risk of candidate target 214 receiving a targeted attack is low, adjustment module 110 may relax or remove restrictions from security policy 216. In this way, the systems described herein may enable organizations to more effectively direct anti-malware detection systems towards targets that are at high risks of targeted attacks, rather than consuming excessive computing resources and/or adding unnecessary inconveniences to protect targets that are at low risks.

In some embodiments, the disclosed systems may detect targeted malware attacks after security policy 216 has been adjusted. For example, based on determining that the probability of candidate target 214 receiving a targeted malware attack exceeds a predetermined threshold, adjustment module 110 may implement an additional email scanning process for emails originating from outside of the country in which candidate target 214 is located. At some point after the additional scanning process is implemented, target module 108 may identify an email that originated from another country. Target module 108 may determine that the email claims to originate from another individual within an organization associated with candidate target 214. Therefore, target module 108 may determine that the sender of the email is illegitimate based on determining that the email should have originated from the same county in which candidate target 214 is located.

The methods described herein may be used to prevent targeted malware attacks in a variety of contexts. In one embodiment, an organization may use the disclosed systems to determine a relative level of its own risk compared to other organizations in order to adjust its security policies to match those of organizations with similar risk levels. In another embodiment, the systems described herein may be used to identify certain groups of individuals (e.g., departments, employees at a certain level within a management hierarchy) within an organization that are at elevated risks of targeted attacks compared to other groups. In a further embodiment, an organization may implement the disclosed systems across multiple computing devices of individuals within the organization in order to dynamically analyze the risk factors of individuals as they change, and update security policies accordingly.

As described above, by identifying characteristics (e.g., risk factors) of targets of previous targeted malware attacks, the disclosed systems and methods may quantify (via, e.g., analyses used in epidemiological studies) an association between the risk factors and the targeted malware attacks. In addition, the disclosed systems and methods may use the associations between the risk factors and the previous targeted malware attacks to predict and prevent future targeted malware attacks. For example, the disclosed systems and methods may adjust security policies assigned to candidate targets of targeted malware attacks based on the degree to which characteristics of the candidate targets are associated with previous targeted attacks. As such, the disclosed systems and methods may prevent malicious attacks that are specifically directed to targets based on profiles of the targets, therefore increasing the safety and security of sensitive information handled by the targets.

Figure 6:
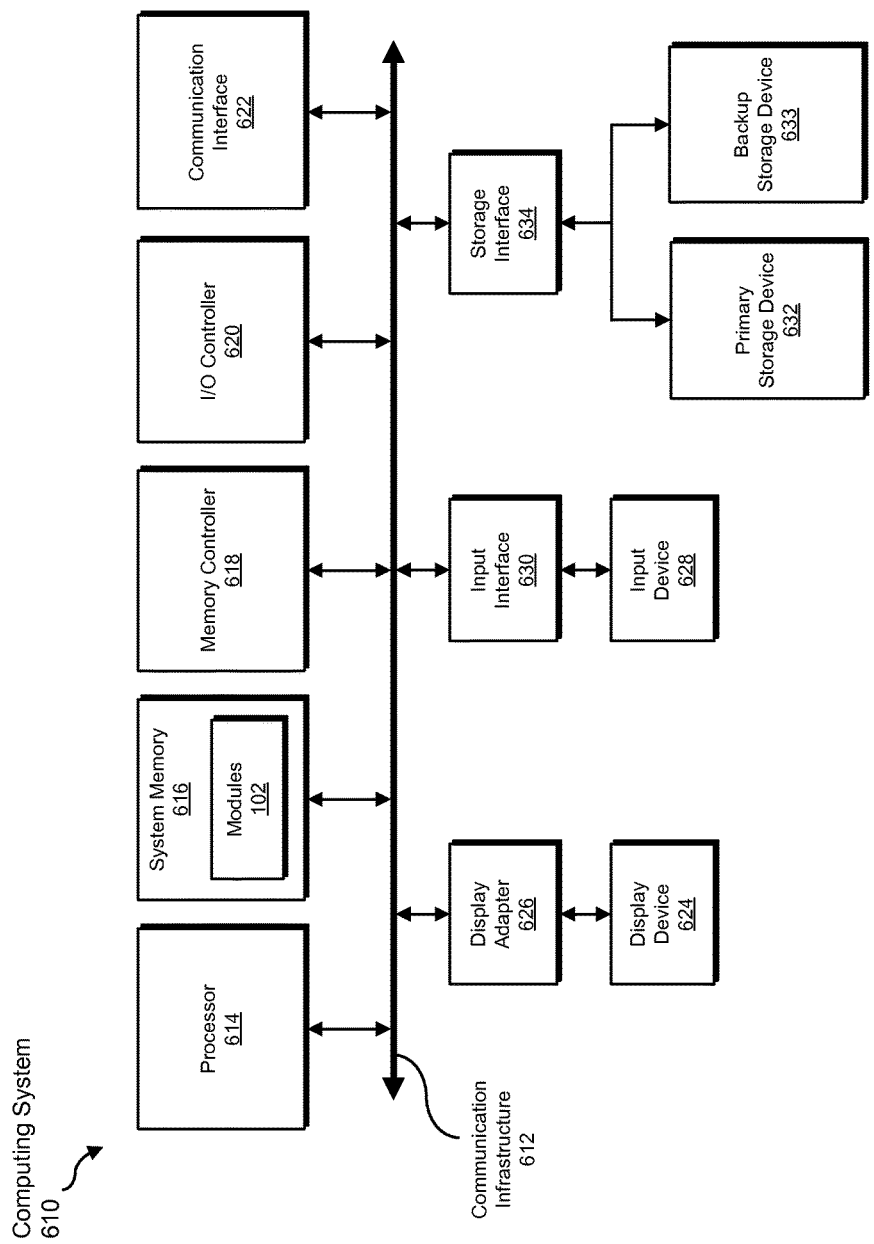
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
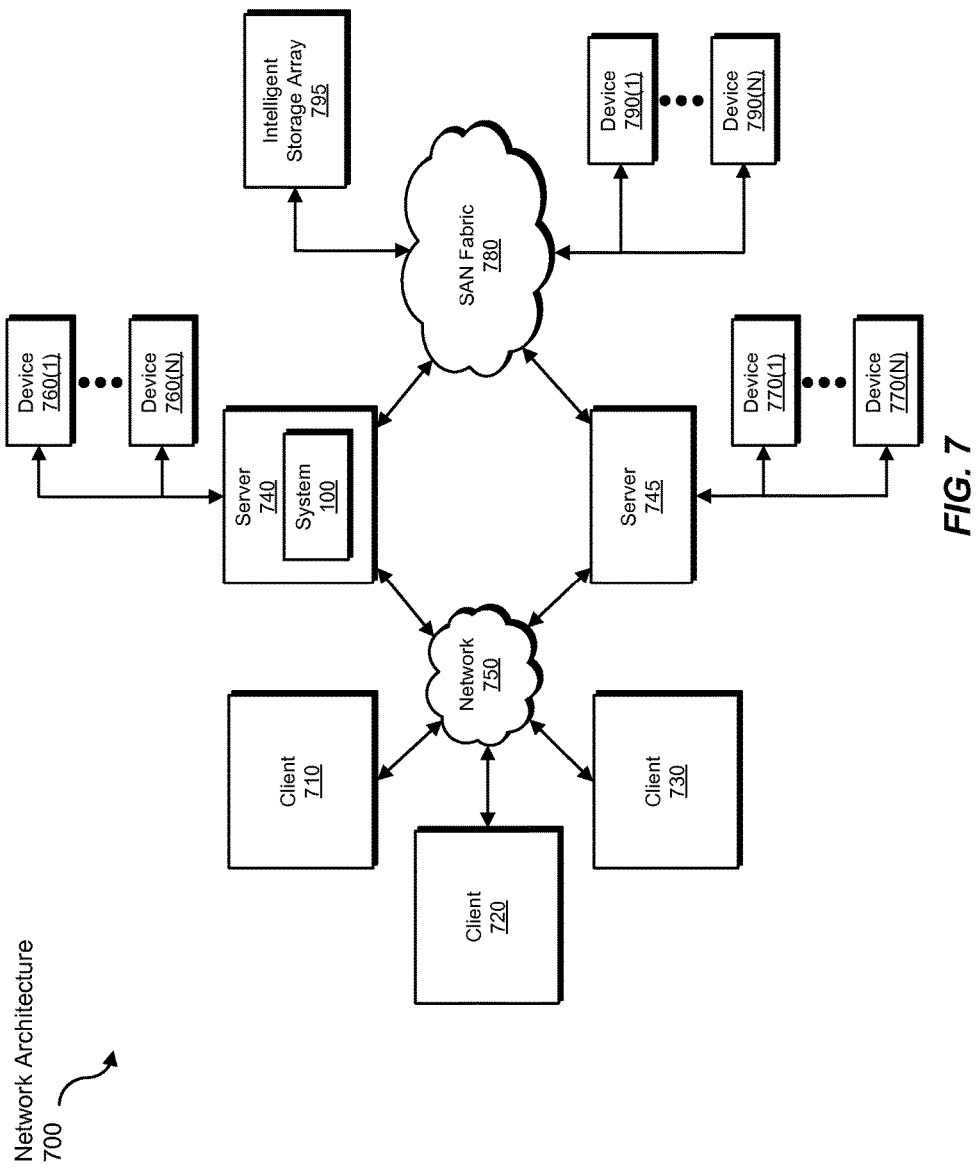
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for preventing targeted malware attacks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a risk factor of targets of previous targeted malware attacks, transform the risk factor, output a result of the transformation to a storage or output device, use the result of the transformation to prevent targeted malware attacks, and store the result of the transformation to a memory or storage. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preventing targeted malware attacks, at least a portion of the method being performed by a computing device comprising at least one processor, the method comprising:
identifying entities that were targets of previous targeted malware attacks, the previous targeted malware attacks comprising customized attacks designed for and directed to the entities based on characteristics of the entities;
identifying, by selecting one or more of the characteristics of the entities that were the targets of the previous targeted malware attacks, a candidate risk factor for targeted malware attacks that indicates a characteristic potentially associated with being a target of a targeted malware attack;
calculating a degree of association between the candidate risk factor and the previous targeted malware attacks by comparing rates of targeted malware attacks between a group that possesses the candidate risk factor and a group that does not possess the candidate risk factor;
identifying a candidate target of a targeted malware attack by identifying an entity that possesses the candidate risk factor;
calculating, based at least in part on the degree of association between the candidate risk factor and the previous targeted malware attacks, a probability that the targeted malware attack will be directed to the candidate target;
adjusting a security policy assigned to the candidate target of the targeted malware attack based on the calculated probability; and
protecting a computing system used by the candidate target from targeted malware attacks by enforcing the adjusted security policy on the computing system.

2. The method of claim 1, wherein: the targets of the previous targeted malware attacks comprise organizations; and the candidate risk factor for the organizations comprises at least one of: a sector of the organizations; and a size of the organizations.

3. The method of claim 1, wherein: the targets of the previous targeted malware attacks comprise individuals; and the candidate risk factor for the individuals comprises at least one of: a job level of the individuals; a job type of the individuals; a geographic location of the individuals; and a number of interpersonal connections made by the individuals via a social networking site.

4. The method of claim 1, wherein comparing the rates of targeted malware attacks between the group that possesses the candidate risk factor and the group that does not possess the candidate risk factor comprises identifying:
a ratio of individuals within the group that possesses the candidate risk factor who were not targets of the previous targeted malware attacks; and
a ratio of individuals within the group that does not possess the candidate risk factor who were targets of the previous targeted malware attacks.

5. The method of claim 1, wherein:
the candidate target comprises an individual within an organization; and adjusting the security policy comprises adjusting the security policy based further on a combination of a calculated degree of association for a candidate risk factor of the individual and a calculated degree of association for a candidate risk factor of the organization.

6. The method of claim 1, wherein adjusting the security policy assigned to the candidate target is performed in response to determining that the calculated probability exceeds a predetermined threshold.

7. The method of claim 1, wherein adjusting the security policy assigned to the candidate target comprises at least one of:
tightening existing restrictions imposed by the security policy; adding new restrictions to the security policy; relaxing existing restrictions imposed by the security policy; and removing restrictions from the security policy.

8. The method of claim 1, further comprising detecting, based on the adjusted security policy, that an attacker directed the targeted malware attack to the candidate target.

9. A system for preventing targeted malware attacks, the system comprising:
- a risk factor module, stored in memory, that:
    - identifies entities that were targets of previous targeted malware attacks, the previous targeted malware attacks comprising customized attacks designed for and directed to the entities based on characteristics of the entities; and
    - identifies, by selecting one or more of the characteristics of the entities that were the targets of the previous targeted malware attacks, a candidate risk factor for targeted malware attacks that indicates a characteristic potentially associated with being a target of a targeted malware attack;
- a calculation module, stored in memory, that calculates a degree of association between the candidate risk factor and the previous targeted malware attacks by comparing rates of targeted malware attacks between a group that possesses the candidate risk factor and a group that does not possess the candidate risk factor;
- a target module, stored in memory, that identifies a candidate target of a targeted malware attack by identifying an entity that possesses the candidate risk factor;
- an adjustment module, stored in memory, that:
    - calculates, based at least in part on the degree of association between the candidate risk factor and the previous targeted malware attacks, a probability that the targeted malware attack will be directed to the candidate target;
    - adjusts a security policy assigned to the candidate target of the targeted malware attack based on the calculated probability; and
    - protects a computing system used by the candidate target from targeted malware attacks by enforcing the adjusted security policy on the computing system; and
- at least one processor that executes the risk factor module, the calculation module, the target module, and the adjustment module.

10. The system of claim 9, wherein:
the targets of the previous targeted malware attacks comprise organizations; and the candidate risk factor for the organizations comprises at least one of: a sector of the organizations; and a size of the organizations.

11. The system of claim 9, wherein:
the targets of the previous targeted malware attacks comprise individuals; and the candidate risk factor for the individuals comprises at least one of: a job level of the individuals; a job type of the individuals; a geographic location of the individuals; and a number of interpersonal connections made by the individuals via a social networking site.

12. The system of claim 9, wherein the calculation module compares the rates of targeted malware attacks between the group that possesses the candidate risk factor and the group that does not possess the candidate risk factor by identifying:
a ratio of individuals within the group that possesses the candidate risk factor who were not targets of the previous targeted malware attacks; and
a ratio of individuals within the group that does not possess the candidate risk factor who were targets of the previous targeted malware attacks.

13. The system of claim 9, wherein:
the candidate target comprises an individual within an organization; and
the adjustment module adjusts the security policy based further on a combination of a calculated degree of association for a candidate risk factor of the individual and a calculated degree of association for a candidate risk factor of the organization.

14. The system of claim 9, wherein the adjustment module adjusts the security policy assigned to the candidate target in response to determining that the calculated probability exceeds a predetermined threshold.

15. The system of claim 9, wherein the adjustment module adjusts the security policy assigned to the candidate target by at least one of:
tightening existing restrictions imposed by the security policy; adding new restrictions to the security policy; relaxing existing restrictions imposed by the security policy; and
removing restrictions from the security policy.

16. The system of claim 9, wherein the target module further detects, based on the adjusted security policy, that an attacker directed the targeted malware attack to the candidate target.

17. A non-transitory computer-readable medium comprising one or more computer-executable instructions that, when executed by at least one processor of a computing device, cause the computing device to:
- identify entities that were targets of previous targeted malware attacks, the previous targeted malware attacks comprising customized attacks designed for and directed to the entities based on characteristics of the entities;
- identify, by selecting one or more of the characteristics of the entities that were the targets of the previous targeted malware attacks, a candidate risk factor for targeted malware attacks that indicates a characteristic potentially associated with being a target of a targeted malware attack;
- calculate a degree of association between the candidate risk factor and the previous targeted malware attacks by comparing rates of targeted malware attacks between a group that possesses the candidate risk factor and a group that does not possess the candidate risk factor;
- identify a candidate target of a targeted malware attack by identifying an entity that possesses the candidate risk factor;
- calculate, based at least in part on the degree of association between the candidate risk factor and the previous targeted malware attacks, a probability that the targeted malware attack will be directed to the candidate target;
- dynamically adjust a security policy assigned to the candidate target of the targeted malware attack based on the calculated probability; and
- protect a computing system used by the candidate target from targeted malware attacks by enforcing the adjusted security policy on the computing system.

18. The non-transitory computer-readable medium of claim 17, wherein:
the targets of the previous targeted malware attacks comprise organizations; and the candidate risk factor for the organizations comprises at least one of: a sector of the organizations; and a size of the organizations.

19. The non-transitory computer-readable medium of claim 17, wherein: the targets of the previous targeted malware attacks comprise individuals; and the candidate risk factor for the individuals comprises at least one of: a job level of the individuals; a job type of the individuals; a geographic location of the individuals; and a number of interpersonal connections made by the individuals via a social networking site.

20. The non-transitory computer-readable medium of claim 17, wherein the one or more computer-executable instructions cause the computing device to compare the rates of targeted malware attacks between the group that possesses the candidate risk factor and the group that does not possess the candidate risk factor by identifying:
- a ratio of individuals within the group that possesses the candidate risk factor who were not targets of the previous targeted malware attacks; and
- a ratio of individuals within the group that does not possess the candidate risk factor who were targets of the previous targeted malware attacks.

\* \* \* \* \*